(12) United States Patent
Matsuyama et al.

(10) Patent No.: US 6,893,372 B2
(45) Date of Patent: May 17, 2005

(54) ROLLER BEARING, TRANSMISSION USING THE SAME AND DIFFERENTIAL GEAR

(75) Inventors: Hiroki Matsuyama, Kitakatsuragi-gun (JP); Akiyuki Suzuki, Kashihara-shi (JP); Yasunari Abo, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/463,065

(22) Filed: Jun. 17, 2003

(65) Prior Publication Data

US 2003/0232681 A1 Dec. 18, 2003

(30) Foreign Application Priority Data

Jun. 18, 2002 (JP) ..................... P2002-177348
May 30, 2003 (JP) ..................... P2003-155437

(51) Int. Cl.$^7$ ............................................. F16H 48/06
(52) U.S. Cl. ...................... 475/220; 475/245; 475/246; 475/253; 475/348; 74/333; 384/450; 384/569; 384/571
(58) Field of Search ................. 475/220, 245, 475/246, 253, 348; 74/333; 384/450, 569, 571

(56) References Cited

U.S. PATENT DOCUMENTS

| | | | | |
|---|---|---|---|---|
| 5,133,608 A | * | 7/1992 | Yamaguchi et al. | 384/50 |
| 5,456,538 A | * | 10/1995 | Honda et al. | 384/569 |
| 5,943,911 A | * | 8/1999 | Beckerman | 74/333 |
| 6,425,840 B1 | * | 7/2002 | Johansson | 475/245 |
| 6,447,168 B2 | * | 9/2002 | Tsujimoto et al. | 384/450 |
| 6,464,398 B2 | * | 10/2002 | Takehara et al. | 384/450 |
| 6,547,443 B2 | * | 4/2003 | Hanai et al. | 384/571 |
| 6,623,168 B2 | * | 9/2003 | Matsuyama et al. | 384/568 |

FOREIGN PATENT DOCUMENTS

| | | |
|---|---|---|
| JP | 5-42754 | 6/1993 |
| JP | 7-91452 | 4/1995 |
| JP | 7-103243 | 4/1995 |
| JP | 2000-205275 | 7/2000 |
| JP | 2002-221223 | 8/2002 |

* cited by examiner

*Primary Examiner*—Saul Rodriguez
*Assistant Examiner*—David D. Le
(74) *Attorney, Agent, or Firm*—Jordan and Hamburg LLP (57) ABSTRACT

In order to improve a seizure resistance as well as restricting of a dispersion of a rotation torque, surface roughness of a large diameter side end face (4A) of a tapered roller (4) is defined as a value satisfying both the following conditional expressions (1) and (2).

$$0.04 \, \mu m \leq Ra(r) \leq 0.1 \, \mu m \quad (1)$$

$$0.8 \leq Ra(r)/Ra(c) \leq 1.1 \quad (2)$$

where, Ra(r) is an arithmetic average of roughness in a radial direction on the large diameter side end face of the tapered roller, and Ra(c) is an arithmetic average of roughness in a peripheral direction on the large diameter side end face of the tapered roller.

7 Claims, 9 Drawing Sheets

(ROUGHNESS CURVE)

F I G. 7

(ROUGHNESS CURVE)

ROLLER BEARING, TRANSMISSION USING THE SAME AND DIFFERENTIAL GEAR

BACKGROUND OF THE INVENTION

The present invention relates to a roller bearing, a vehicle-use transmission and a differential gear.

A tapered roller bearing is provided with an outer ring, an inner ring and a plurality of tapered rollers interposed between the outer ring and the inner ring. Collar portions having guide surfaces guiding both end faces in a large diameter side and a small diameter side of the tapered roller in accordance with a slide contact are provided in both end portions of the inner ring in an axial direction. These elements are lubricated by a lubricant such as an oil, a grease or the like. Surface roughness of a contact surface between the end face of the tapered roller and the guide surface of the collar portion of the inner ring exerts an influence on a lubricating property.

Figure 15:
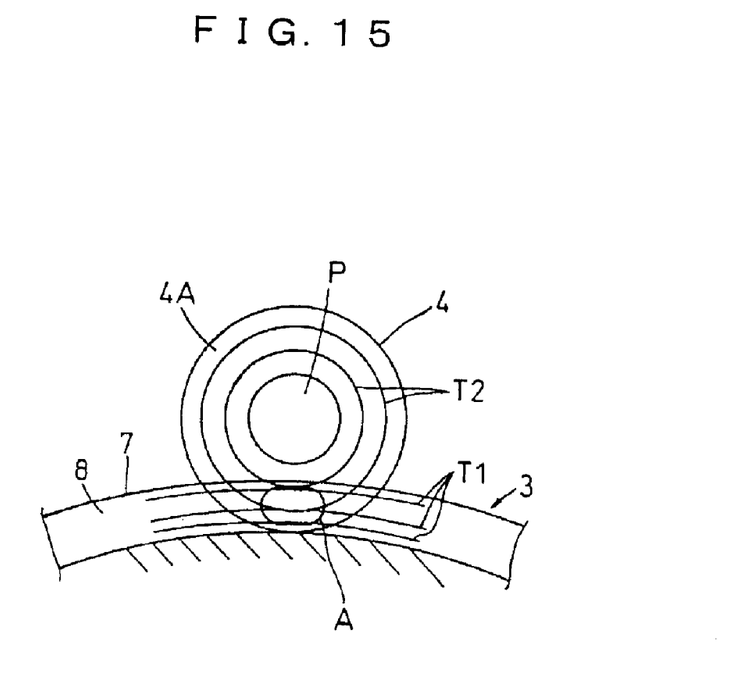
FIG. 15 is a front elevational view showing respective surface shapes of a roller and a collar portion in the conventional art.

A description will be given of the lubricating property with reference to FIG. 15. Reference symbol 4A denotes a large diameter side end face of a tapered roller, and reference numeral 8 denotes a guide surface in a collar portion of an inner ring. In conventional tapered roller bearings, surface roughness of the large diameter side end face 4A of the tapered roller is generally set in which surface roughness in a diametrical direction is higher than surface roughness in a peripheral direction due to the direction of a grinding work.

On the other hand, in a tapered roller bearing used in a vehicle-use transmission, a vehicle-use differential gear or the like, a preload applied at a time of assembling is controlled by a torque under a low speed rotation. When a dispersion of the low speed rotation torque (an assembling torque) is wide, there is developed problems such that an early seizure is caused by an excessive preload, a rigidity reduction is caused by an insufficient preload, and the like. Accordingly, in order to apply a suitable preload to the tapered roller bearing, it is required that the dispersion of the assembling torque is small and a fluctuation thereof is small.

Most of the assembling torque of the tapered roller bearing is caused by friction between the guide surface 8 and the large diameter side end face 4A of the tapered roller in the collar portion of the inner ring 4. Accordingly, a lubricating property such as surface roughness of the guide surface 8 and the large diameter side end face 4A, an oil film thickness formed between them or the like exerts a great influence on a friction coefficient, that is, a torque. The surface roughness of the large diameter side end face 4A of the tapered roller is set so as to inhibit the dispersion of the rotation torque and apply a proper preload, however, a treatment method of the surface exerts a great influence on the surface roughness.

If the surface roughness of the large diameter side end face 4A of the tapered roller is set to this aspect, an oil film formation becomes unstable in the slip contact portion between the large diameter side end face 4A of the tapered roller and the guide surface 8 in the collar portion of the inner ring under the low speed rotation, the dispersion of the rotation torque (the assembling torque) becomes great, and an amount of lubricating oil becomes insufficient in a contact portion A between the large diameter side end face 4A of the tapered roller and the guide surface 8 in the collar portion of the inner ring under a high load or a high speed rotation, whereby it is hard to form a lubricating oil film. Therefore, there is pointed out a problem such as a break of the lubricating oil film, a seizure, a reduction of a seizure resistance, or the like.

SUMMARY OF THE INVENTION

An object of the present invention is to provide a roller bearing which can apply a suitable preload by inhibiting a dispersion of a rotation torque, thereby improving a seizure resistance.

A roller bearing in accordance with the present invention comprises an outer ring, an inner ring and a plurality of rollers interposed between the outer ring and the inner ring, wherein a collar portion having a guide surface guiding an end face of the roller in accordance with a slip contact is provided in at least one end of the outer ring and the inner ring, and surface roughness in at least one of the guide surface of the collar portion and the end face of the roller is defined as a value satisfying both the following conditional expressions (1) and (2).

$$0.04 \ \mu m \leq Ra(r) \leq 0.1 \ \mu m \tag{1}$$

$$0.8 \leq Ra(r)/Ra(c) \leq 1.1 \tag{2}$$

where, Ra(r) is an arithmetic average of roughness in a radial direction on the end face of the roller, and Ra(c) is an arithmetic average of roughness in a peripheral direction on the end face of the roller.

In this case, the roller includes a tapered roller and a cylindrical roller.

In accordance with the present invention, the surface roughness on the end face of the roller becomes balanced in the radial direction and the peripheral direction, and the oil film formation is stabilized in the slip contact portion, whereby it is possible to inhibit the dispersion of the rotation torque, and it is possible to improve a seizure resistance.

In this case, if the value Ra(r) is larger than 0.1 $\mu$m, the friction of the slip contact guide surface of the roller bearing becomes large, so that it is impossible to keep a smooth slip motion. On the other hand, if the value Ra(r) is smaller than 0.04 $\mu$m, the dispersion of the rotation torque becomes large. Further, if the ratio Ra(r)/Ra(c) is smaller than 0.8 or larger than 1.1, the balance of the surface roughness gets off, and the oil film formation becomes unstable.

In accordance with another aspect of the present invention, a microscopic surface shape is applied to the end face of the roller or the guide surface of the collar portion, in accordance with an aspect satisfying the conditional expressions of the surface roughness.

When the surface satisfying the conditions (1) and (2) is formed on the end face of the roller or the guide surface of the collar portion, an oil film forming capacity is kept high even under a condition in which a lubrication environment in the roller end face is inferior, as is apparent from test results, so that a seizure resistance of the roller bearing is improved.

In this case, the term "microscopic" means a shape in an order of submicron meter to micron meter.

Preferably, in accordance with the present invention, the structure can be made such that at least one of a lot of rolling bearings used in an inner portion of a vehicle-use transmission and a vehicle-use differential gear is constituted by a tapered roller bearing, and the tapered roller bearing satisfies the conditional expressions (1) and (2) mentioned above. In this case, it is possible to improve a rotation performance and a durability of the transmission and the differential gear.

As an example of the transmission mentioned above, there is a structure in which an engine side input shaft provided with a plurality of gears is rotatably supported to a casing by a pair of rolling bearings, a drive wheel side counter shaft provided with a plurality of gears is rotatably supported to the casing by a pair of rolling bearings, and a rotation of the input shaft is transmitted to the counter shaft via any of the gears.

As another example of the transmission, there is a structure comprising an engine side input shaft provided with a gear, a counter shaft provided with a plurality of gears, and an output shaft provided with a plurality of gears, in which these shafts are rotatably supported to a casing by rolling bearings respectively, and a rotation of the input shaft is transmitted to the output shaft via any of the gears.

As an example of the differential gear, there is a structure in which a drive pinion shaft provided with a drive pinion is rotatably supported to a casing by a pair of rolling bearings, each of a pair of side gears is rotatably supported to the casing by each one rolling bearing, and a rotation of the drive pinion is transmitted to the side gear via a ring gear meshing with the drive pinion.

As another example of the differential gear, there is a structure comprising a ring gear meshed with an output gear of a transmission, and a pair of side gears each rotatably supported to a casing by each one rolling bearing, in which a rotation of the output gear is transmitted to the side gear via a ring gear.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF PREFERRED EMBODIMENTS

Figure 1:
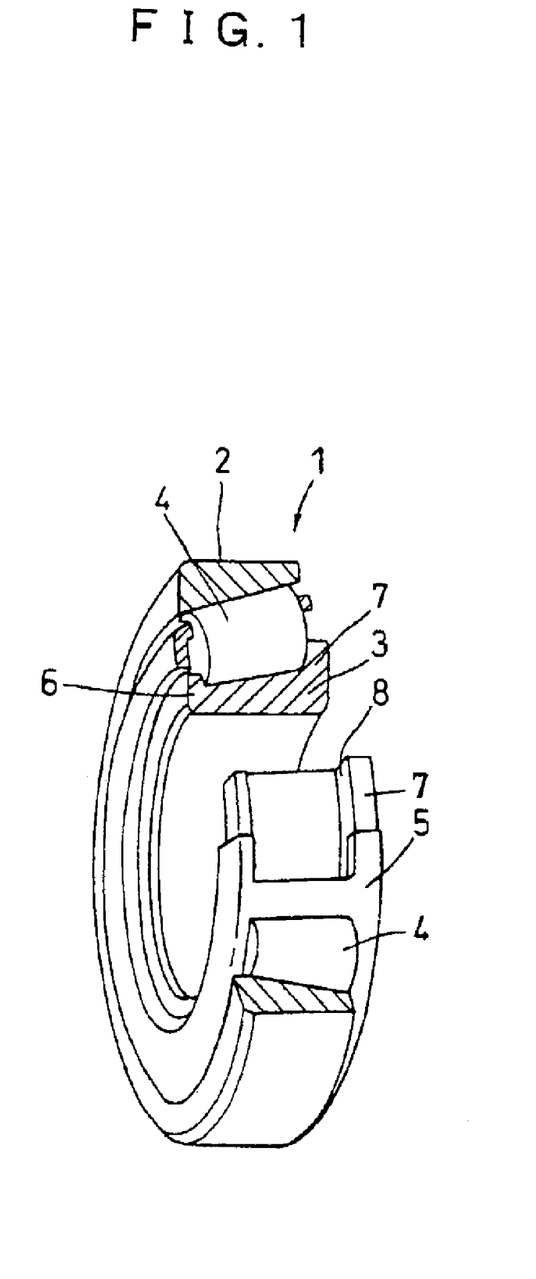
FIG. 1 is a perspective view showing a tapered roller bearing in accordance with a preferred embodiment of the present invention in a partly breaking manner.

A description will be given of a tapered roller bearing in accordance with a preferred embodiment of the present invention with reference to FIG. 1. A tapered roller bearing is constituted by an outer ring 2, an inner ring 3, a plurality of tapered rollers 4 assembled in a state of being interposed between both the rings 2 and 3, and a cage 5 holding the respective tapered rollers 4. The tapered rollers 4 and both the members 2 and 3 are oil lubricated by a lubricant such as oil, a grease or the like.

The inner ring 3 is formed approximately in a truncated cone shape, and collar portions 6 and 7 are respectively formed in a tapered end edge portion and an expanded end edge portion. The collar portion 7 in a large diameter side in the collar portions 6 and 7 is structured such as to guide a large diameter side end face 4A of each of the tapered rollers 4 in a state of being in slide contact by a guide surface 8.

Two-dimensional surface roughness of the large diameter side end face 4A of the tapered roller 4 is defined to a value satisfying both the following conditional expressions (1) and (2).

$$0.04\ \mu m \leq Ra(r) \leq 0.1\ \mu m \qquad (1)$$

$$0.8 \leq Ra(r)/Ra(c) \leq 1.1 \qquad (2)$$

where, Ra(r) is an arithmetic average of roughness in a radial direction on the large diameter side end face 4A of the tapered roller 4, and Ra(c) is an arithmetic average of roughness in a peripheral direction on the large diameter end face of the tapered roller 4. In this case, a standard of the arithmetic average of roughness Ra is Japanese Industrial Standards (JIS) B0601. The two-dimensional surface roughness may be defined with respect to the guide surface 8 in the large diameter side collar portion 7 in the same manner as the conditional expressions.

A description will be given in more detail.

First, a description will be given of a structure for forming the large diameter side end face 4A of the tapered roller 4 so as to have the surface roughness mentioned above. In the tapered roller bearing 1 in accordance with the present invention, it is set such that the surface roughness of the large diameter side end face 4A of the tapered roller 4 satisfies both the expressions mentioned above. A circular shallow recess P is formed in a center portion of the large diameter side end face 4A, and no grinding work is applied to this recess P. If the surface roughness of the large diameter side end face 4A of the tapered roller 4 satisfies the expressions (1) and (2) as mentioned above, the surface roughness becomes high not only in the diametrical direction but also in the peripheral direction.

The surface provided with this surface roughness can be formed, for example, by applying a microscopic surface shape in accordance with a method shown below.

A description will be given of a method of applying a predetermined microscopic surface shape to the large diameter side end face 4A of the tapered roller 4 with reference to FIG. 2. The tapered roller 4 repeats a contact for being ground and a retraction from the contact position, for example, with respect to a grinding application surface 11 in a grinding disc grind stone 10, every extremely short time, and the tapered roller 4 is ground while being rotated around an axis at a fixed speed.

Figure 2:
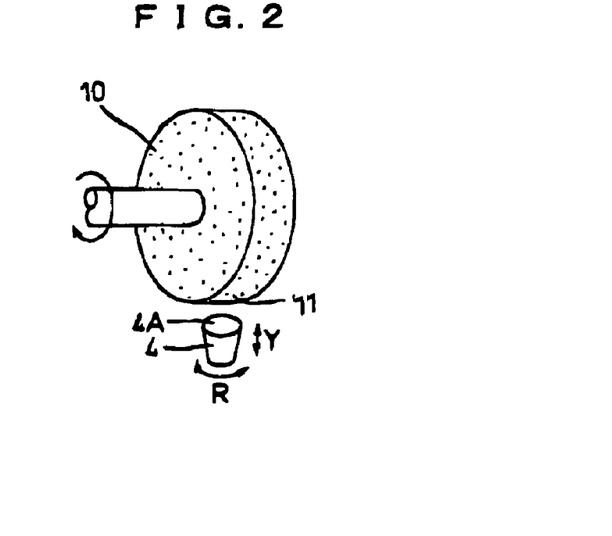
FIG. 2 is a conceptual view used for describing a method of grinding an end face of a tapered roller.

In detail, the tapered roller 4 is rotated at a predetermined speed by making the large diameter side end face 4A of the tapered roller 4 oppose to the grinding application surface 11 of the grind stone 10 so as that the large diameter side end face 4A can move apart from or close to the grinding application surface 11 (reciprocate along a direction Y in FIG. 2), and rotating (rotating in a fixed direction in which a direction R in FIG. 2 is set to a circumferential direction) the support tool around the axis of the tapered roller 4 while keeping the opposing state in which the grinding application surface 11 and the large diameter side end face 4A are in parallel to each other, in a state in which the tapered roller 4 is supported by a support tool (not shown) such as a chuck or not. Further, the operation that the large diameter side end face 4A of the tapered roller 4 is brought into contact with the grind stone 10 so as to be ground and is immediately retracted from the grinding position is repeated for an extremely short time by moving the support tool in a direction Y in accordance with a control of a control means provided in the grinding machine. Accordingly, in view of the fact that the tapered roller 4 rotates in the large diameter side end face 4A of the tapered roller 4 in the manner mentioned above, the grinding operation is carried out without a grinding direction of the large diameter side end face 4A of the tapered roller 4 by the grind stone 10 being specified to the peripheral direction. Therefore, a surface shape in which the surface roughness is balanced in the radial direction and the peripheral direction within a predetermined range is applied to the large diameter side end face 4A of the tapered roller 4 by abrasive grains of the grind stone 10.

Figure 3:
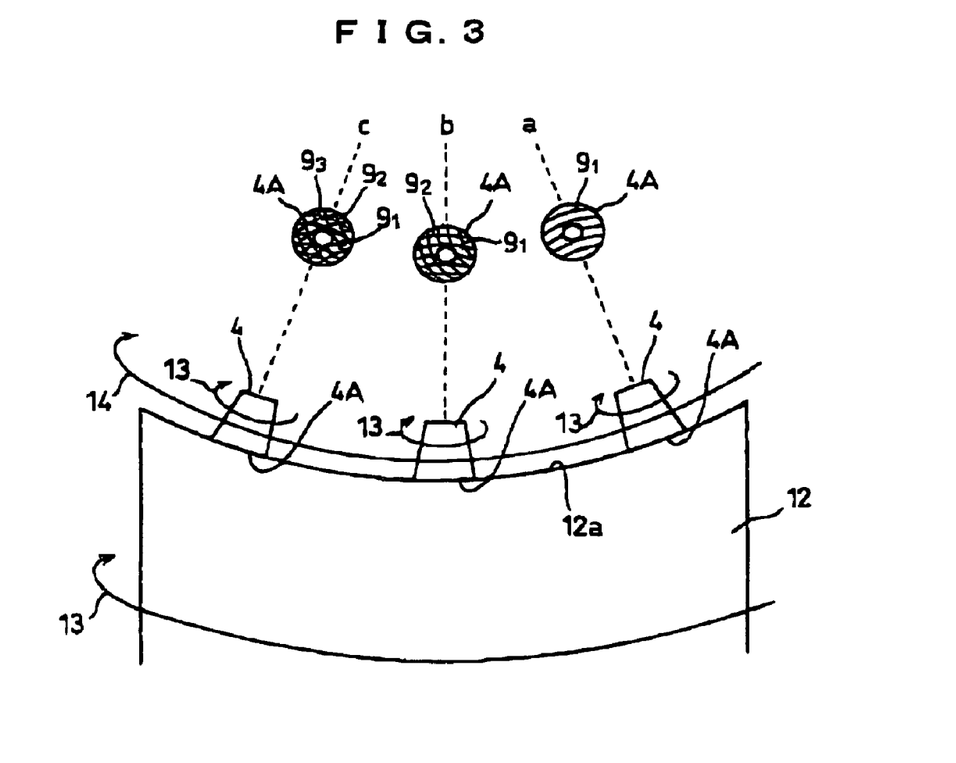
FIG. 3 is a conceptual view used for describing another method of grinding the end face of the tapered roller.

A description will be given of another working method of applying a predetermined microscopic surface shape with reference to FIG. 3. In FIG. 3, reference numeral 12 denotes a grinding work axis rotating in a direction of an arrow 13 at a predetermined rotation speed around an axis. An outside surface 12a of the work axis 12 is formed as a grinding work surface (a grind stone surface) formed in a predetermined recessed curve surface. The tapered roller 4 is transferred so that the large diameter side end face 4A revolves along the outside surface 12a of the work axis 12 in a contact state with the outside surface 12a in a direction of an arrow 14 in the drawing while rotating on its own axis in a direction of an arrow 13.

First, when the tapered roller 4 is at a transfer position "a", a surface shape of a first direction is applied to the large diameter side end face 4A of the tapered roller 4 by the grinding work surface 12a of the grinding work axis 12. Next, when the tapered roller 4 is at a transfer position b, a surface shape is also applied to the large diameter side end face 4A in the same manner in a second direction which is different from the first direction. Further, when the tapered roller 4 is at a transfer position c, a surface shape is also applied to the large diameter side end face 4A in the same manner in a third direction which is different from the first direction and the second direction. In the manner mentioned above, since the large diameter side end face 4A of the tapered roller 4 is ground in the middle of the transfer in the direction of the arrow 14, the large diameter side end face 4A of the tapered roller 4 is applied the surface shape in which the surface roughness is balanced in the radial direction and the peripheral direction within the predetermined range, in accordance with the grinding.

In this case, for convenience of explanation, the tapered roller 4 has three directions at three transfer positions "a", b and c. In practical, since the tapered roller 4 and the grinding work axis 12 both rotate on their axes, the large diameter side end face 4A of the tapered roller 4 is approximately evenly ground as a whole, and is formed in the surface shape having the good balance in the predetermined range. Further, it is possible to finish a predetermined roller end face roughness by suitably setting grinding conditions such as a shape of the grinding work surface, a kind of the grind stone, a rotation speed of the grinding work axis, a rotation speed of the roller rotation, a revolving speed, a contact force between the roller end face and the working face, and the like.

Figure 4:
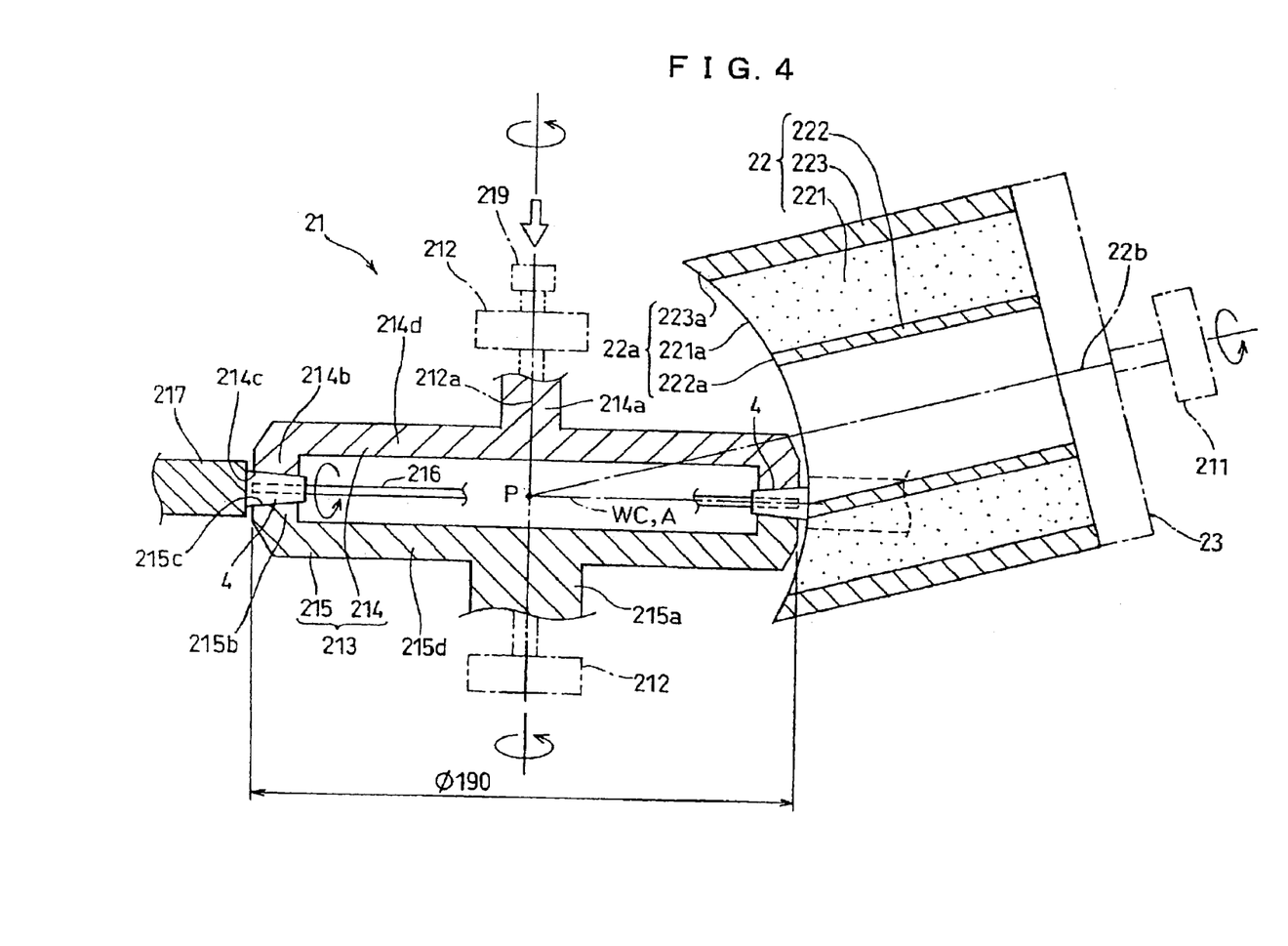
FIG. 4 is a schematic view of an outline structure of a grinding device utilizing an abrasive wheel.

With reference to FIG. 4, a description will be given of a grinding work utilizing a grind wheel. FIG. 4 is a schematic view showing an outline structure of a grinding device utilizing the grind wheel. A grinding device 21 is structured such as to grind a large end face of the tapered roller for the tapered roller bearing in a convex curve shape comprising a spherical surface, and works a tapered roller having an approximately tapered trapezoidal shape. The grinding device 21 has the grind wheel 22 mentioned above rotated around a center axis 22b by a first driving means 211, and a support body 213 rotated around a rotation axis 212a crossing to the center axis 22b by a second driving means 212 and holding a plurality of tapered rollers 4. The support body 213 includes a pair of discs 214 and 215 rotating around the rotation axis 212a. These discs 214 and 215 respectively have disc-shaped main body portions 214d and 215d, shaft portions 214a and 215a extending along the rotation axis 212a from center portions of the main body portions 214d and 215d and connected to the second driving means 212 so as to be driven, and annular protruding portions 214b and 215b arranged in outer peripheral edges of the main body portions 214d and 215d and protruding in opposite directions so as to move close to each other. Mutually opposing end faces of the annular protruding portions 214b and 215b constitute support surfaces 214c and 215c, and a plurality of tapered rollers 4 constituted by the tapered rollers are gripped and held between the support surfaces 214c and 215c. The support surfaces 214c and 215c are constituted by conical taper surfaces inclined in opposite direction with each other, and are in contact with peripheral surfaces constituted by the tapered surfaces of the tapered rollers 4.

Center axes W of a plurality of tapered rollers 4 supported between the support surfaces 214c and 215c are radially arranged around an intersecting point P between a plane A orthogonal to the rotation axis 212a and the rotation axis 212a, within the plane A. Further, a plurality of tapered rollers 4 are regulated in a circumferential interval, on a circular arc within the plane A having the intersecting point P as a center, for example, by a cage 216 made up of axes passing through the a center hole thereof, for example, are held in a cyclotomic manner. Further, the large end face of the tapered roller 4 is directed to an outer side in a radial direction of the discs 214 and 215, and is arranged at a predetermined radial position. A circle passing through the radial position, having the intersecting point P as a center and included in the plane A is structured so as to pass approximately along the end face 22a of the grind wheel 22, particularly pass through an inner peripheral edge portion of the end face 222a, and a center axis 22b of the grind wheel 22 is structured so as to cross to the intersecting point P. The second driving means 212 is provided in a form of a pair, and respectively drive a pair of discs 214 and 215. A pair of discs 214 and 215 support a plurality of tapered rollers 4 so as to freely rotate on their own axes around a center axis WC of the taper rollers 4, and make a plurality of tapered rollers 4 rotate on their own axes on the basis of a peripheral speed difference between the support surfaces 214c and 215c by relatively rotating. Further, the peripheral speed difference mentioned above is set so as to revolve the tapered rollers 4 around the rotation axis 212a. Each of the tapered rollers 4 is fed in a direction F along a circular feeding raceway 218 constituted by a revolving raceway of the tapered rollers.

Figure 5:
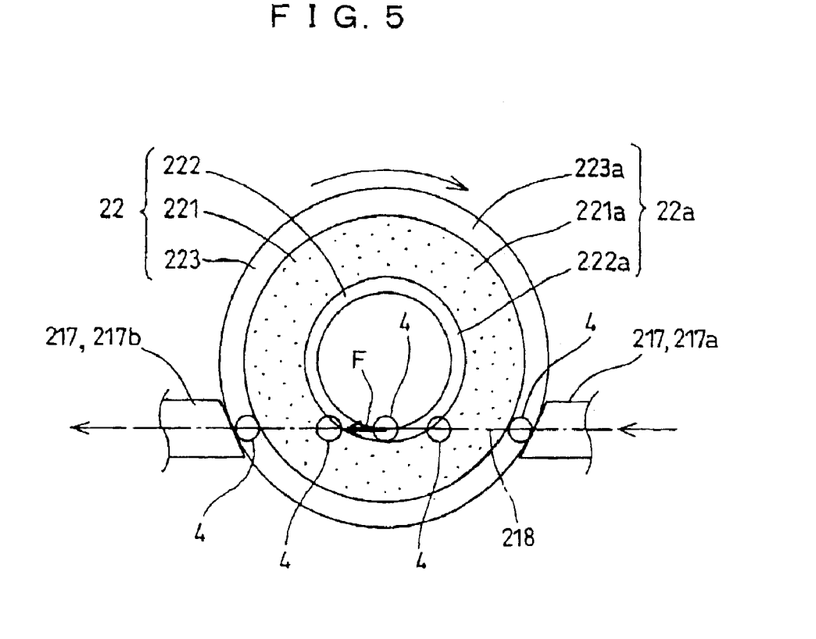
FIG. 5 is a view obtained by seeing the abrasive wheel from a side of an end face.

As shown in FIG. 5, the tapered rollers are fed along the end face 22a of the grind wheel 22 for grinding the large end faces of the tapered rollers in a part area of the feeding raceway 218 (which is curved in a perpendicular direction to a paper surface of FIG. 5), and are guided by a tapered roller guide 217 in the other areas of the feeding raceway 218. The tapered roller guide 217 is formed in a shape that a part of a ring is notched, is placed so that an inner peripheral surface is close to an outer peripheral portion of the support body 213, and makes the large end faces of the tapered rollers 4 be along the inner peripheral surface.

Further, a pair of discs 214 and 215 are energized by an energizing means 219 so that the discs 214 and 215 move close to each other, and the large end faces of the tapered rollers are pressed against the end face 22a of the grind wheel 22 and the tapered roller guide 217 by the taper surfaces of the support surfaces 214c and 215c. In the grinding device 21, when rotating the grind wheel 22, a grind wheel main body 221, an inner guide 222 and an outer guide 223 integrally rotate. The tapered rollers are fed along the feeding raceway 218 while rotating on their own axes. During the time, it is possible to press the tapered rollers against the end face 22a of the grind wheel 22, and it is possible to form the convex curve shape on the tapered rollers by the grinding surface 221a.

An oilless seizure test is applied as a less lubrication condition to the embodiment product provided with the tapered roller 4 to which the predetermined surface roughness is applied on the basis of this grinding method and the prior art product, and a small amount of oil supplying test is carried out. A description will be given of the test condition.

The prior art product and the embodiment product both employ a tapered roller bearing having an inner diameter 45 mmφ, an outer diameter 100 mmφ and a width 38.25 mm.

The specification of the prior art product is as follows.

That is, the guide surface 8 of the inner ring 3 in the large diameter side collar portion 6 is ground in a coaxial shape in accordance with the grinding work, and a ten-point average roughness Rz in the radial direction is set to 0.44 μm. The surface roughness of the large diameter side end face 4A in the tapered roller 4 is ground in the coaxial shape by a through feed working machine, an arithmetic average roughness Ra(r) in the radial direction is 0.0725 μm (Rz: 0.493 μm), and an arithmetic average roughness Ra(c) in the peripheral direction is 0.0302 μm (Rz: 0.204 μm).

Further, the specification of the embodiment product is as follows.

That is, the roughness of the guide surface 8 in the large diameter side collar portion 6 of the inner ring 3 is set the same as that of the prior art product mentioned above.

The roughness of the large diameter side end face 4A of the tapered roller 4 is ground in a state in which the surface roughness is balanced in the radial direction and the peripheral direction, in accordance with the method mentioned above, and an arithmetic average roughness Ra(r) in the radial direction is 0.0954 μm, and an arithmetic average roughness Ra(c) in the peripheral direction is 0.0909 μm. A concrete working condition at this time is the inner guide 222 of the grind wheel 2: 50 mmφ, the outer guide 223 of the grind wheel 2: 130 mmφ, the energizing means 219: the applied pressure: 350 kg, the tapered roller: rotating speed 4 rpm, the first driving means 211: 2500 rpm, the second driving means 212 (the upper side in FIG. 4): 280 rpm (190 mmφ), the second driving means 212 (the lower side in FIG. 4): 270 rpm (190 mmφ). The abrasive material employs a generally used abrasive material, for example, an alumina abrasive grain or the like, and the bonding agent employs a generally used bonding agent such as a resin bond or the like.

In this case, the roughness of the large diameter side end face of the tapered roller is determined as follows by using the surface roughness measuring machine.

Position of measurement: four positions on the large diameter side end face 4A of the tapered roller 4 at about 90 degrees in the peripheral direction Method of measurement: measuring the surface roughness (the arithmetic average roughness Ra) in the radial direction and the peripheral direction, in each of four positions mentioned above Roughness filter: Gaussian filter Cut-off length: 0.25 mm In the measurement mentioned above, the computation of the roughness is carried out by setting the average value of the surface roughness in the peripheral direction at four positions mentioned above to Ra(c), and setting the average value of the surface roughness in the radial direction to Ra(r). In this case, in the measurement of the roughness, a spherical shape is removed, a swell component is removed, and a roughness component is extracted.

Figure 6:
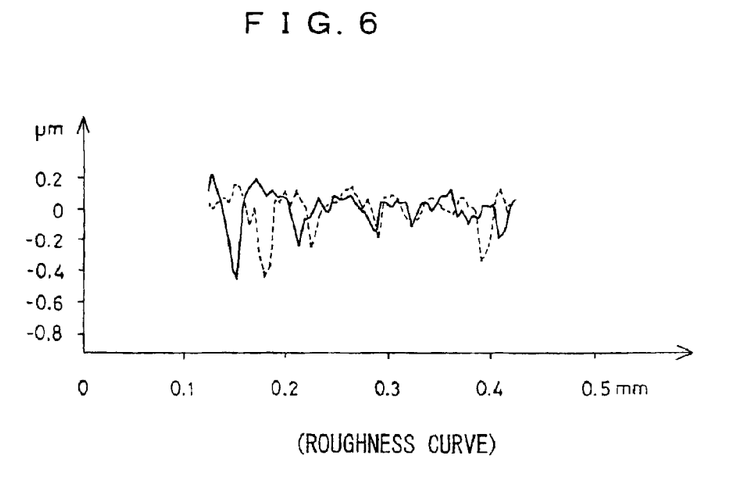
FIG. 6 is a view showing respective roughness curves in a radial direction and a circumferential direction of a large diameter side end face of a tapered roller in accordance with an embodiment product.

FIG. 6 shows a roughness curve in the radial direction of the large diameter side end face 4A of the tapered roller in the embodiment product by using a solid line, and a roughness curve in the circumferential direction by using a broken line. In FIG. 6, a vertical axis indicates a roughness (μm) and a horizontal axis indicates a distance (mm) in the radial direction. In FIG. 6, a difference in shape is small between the roughness curve in the radial direction and the roughness curve in the circumferential direction. That is, it is said that a directionality of the microscopic shape is small on the surface of this end face.

Figure 7:
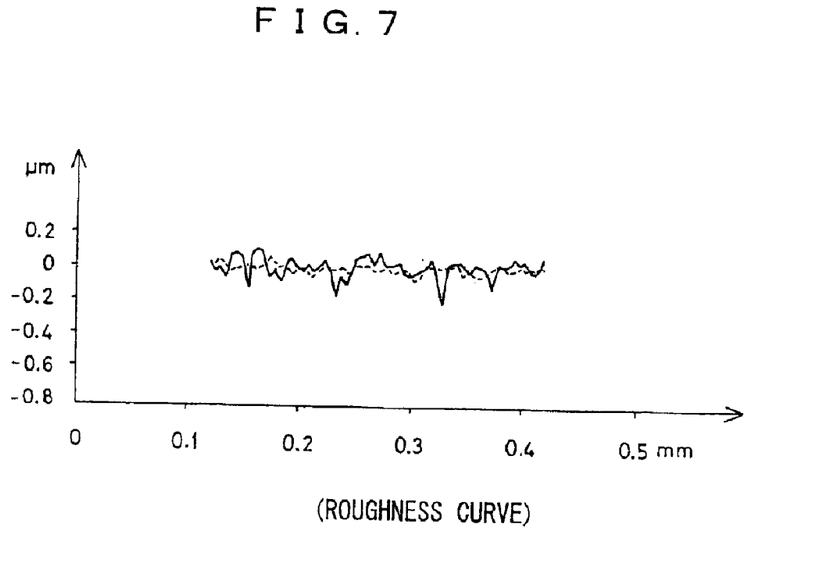
FIG. 7 is a view showing respective roughness curves in a radial direction and a circumferential direction of a large diameter side end face of a tapered roller in accordance with a conventional product.

On the other hand, FIG. 7 shows a roughness curve in the radial direction of the large diameter side end face 4A in the prior art product by using a solid line, and a roughness curve in the circumferential direction of the large diameter side end face 4A in the prior art product by using a broken line. In FIG. 7, a vertical axis indicates a roughness (μm) and a horizontal axis indicates a distance (mm) in each of the directions. In FIG. 7, it is known that the roughness in the radial direction is apparently greater than the roughness in the circumferential direction (the roughness in the radial direction is about three times the roughness in the circumferential direction at the greatest), and the difference between the roughness curves in both the directions is large. That is, it is said that a directionality of the microscopic shape is large on the surface of this end face.

The oilless seizure test is applied to three prior art products and two embodiment product, and the small amount oil supply test is applied to two prior art products and two embodiment products. Further, the tests are carried out by assembling a pair of tapered roller bearings in a testing machine (not shown) in a back-to-back aspect.

Further, in both the tapered roller bearings, the inner rings 3 are rotated by the testing machine.

Oilless Seizure Test

Figure 8:
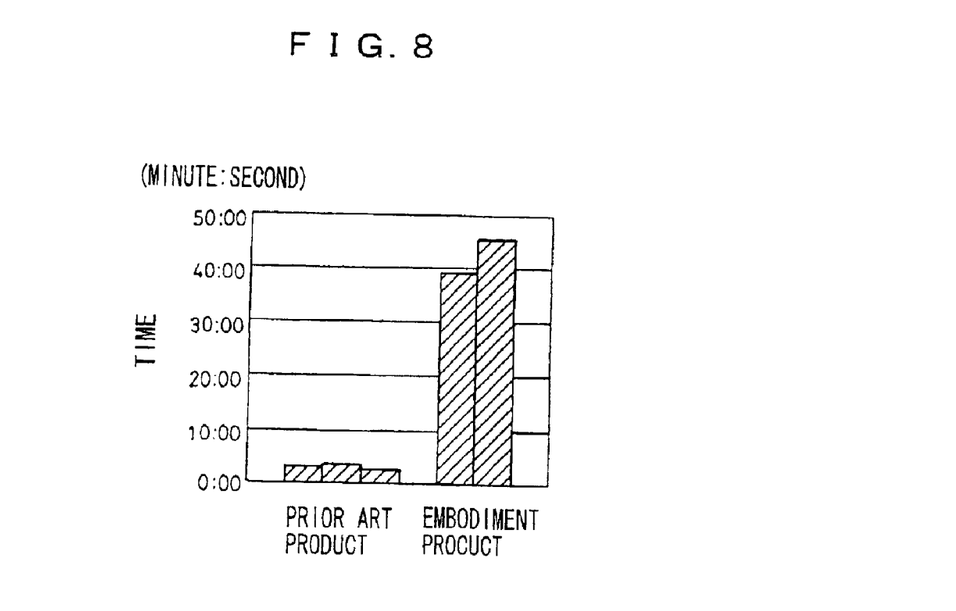
FIG. 8 is a view showing results of an oilless seizure test applied to the large diameter side end face of the tapered roller in each of the embodiment product and the conventional product.

A rotation speed of the inner ring 3 is set to 3800 r/min. The inner ring 3 reaches this rotation speed within 15 seconds. An axial load Fa of 8 kN is applied to the outer ring 3. The lubrication is achieved by assembling the tapered roller 4 in the testing machine after applying a gear oil (SAE85W-90) to the large diameter side end face 4A of the tapered roller 4 and the inner ring assembled parts such as the guide surface 8 of the large diameter side collar portion 6 in the inner ring 3 and the like, leaving in this state for 10 minutes, and driving after this leaving. An oil temperature of the gear oil and a room temperature are both set between 18 and 19 degrees at the testing time. In the case that the rotation of the inner ring 3 is locked or a spark is generated, it is judged that the seizure is generated. Results of the oilless seizure test are shown in FIG. 8. A vertical axis in FIG. 8 shows a time (unit:minute:second) required until the seizure. As is apparent from FIG. 8, under the same rotation speed, the same axial load Fa and the same lubricating condition, the seizure is generated within some minutes in all of three prior art products, and on the contrary, the seizure is generated after 40 minutes or more time has passes in all of two embodiment products. That is, the embodiment products have a seizure resistance approximately ten times or more that of the prior art products.

Small Amount Oil Supply Test

Figure 9:
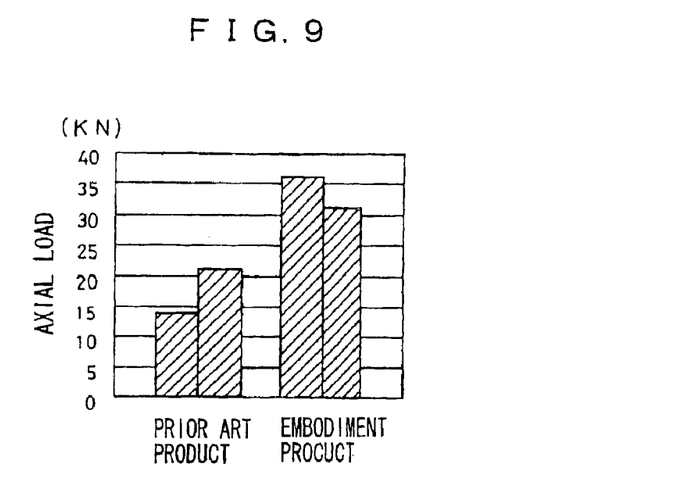
FIG. 9 is a view showing results of a little oil-supply seizure test applied to the large diameter side end face of the tapered roller in each of the embodiment product and the conventional product.

The rotation speed of the inner ring 3 is set to 3800 r/min. The axial load Fa of 10 kN is applied to the outer ring 2 in increments of 1 kN in a step-up manner. A keeping time of one step of the axial load Fa in each of the step-ups is set to 5 minutes. The lubrication is achieved by dripping the gear oil (SAE85W-90) to the collar portion 7 in the large diameter side of the inner ring 3 by 3 milliliters per minute. The oil temperature of the gear oil is set between 18 and 19° C. at the testing time. In the case that the rotation of the inner ring 3 is locked, the spark is generated or the bearing temperature is excessively increased (200° C.), it is determined that the seizure is generated. Results of this small amount oil supply test are shown in FIG. 9. A vertical axis in FIG. 9 indicates the axial load Fa (unit: kN) at a time of the seizure. As is apparent from FIG. 9, when increasing the axial load Fa under the same rotation speed and the same lubricating condition, the seizure is generated in all of three prior art products at a time point when the axial load Fa is increased to about 14 to 21 kN, and on the contrary, the seizure is first generated in all of two embodiment products at a time point when the axial load Fa is increased equal to or more than 31 to 36 kN. That is, the embodiment products have a seizure resistance approximately 1.9 times or more that of the prior art products, with respect to the axial load Fa.

As is apparent from the test results mentioned above, the embodiment products can widely restrict the seizure on the large diameter side end face 4A of the tapered roller 4 and the guide surface of the inner ring in both the oilless and the small amount oil supply, in comparison with the prior art products.

Rotation Torque Dispersion Test

Next, a dispersion of the rotation torque is measured with respect to the embodiment products and the prior art products. The rotation torque applied to the outer ring is measured by applying a rust proofing oil to these bearings, setting the axial load Fa to 8 kN, fixing the outer ring and rotating the inner ring at 50 r/min.

Figure 10:
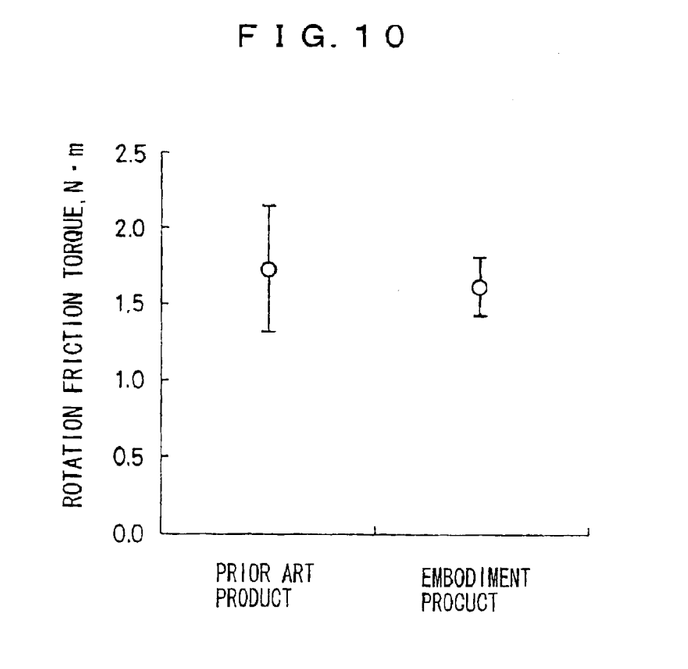
FIG. 10 is a view showing results of measuring a rotation torque dispersion in each of the embodiment product and the conventional product.

FIG. 10 shows measured values of a rotation torque (a friction torque) of the embodiment products and the prior art products. A mark O in FIG. 10 indicates an average value of the torque, and a line extending up and down from the mark O indicates a width of dispersion of the torque. From this drawing, it is known that the dispersion (deflection width) of the rotation torque at the low speed rotation time of the embodiment products is 0.38 N·m, and becomes half or less in comparison with the value 0.83 N·m of the prior art products.

As is apparent from the above, in accordance with the present embodiment, it is possible to widely restrict the seizure by applying the surface roughness satisfying the expressions (1) and (2) mentioned above to the large diameter side end face 4A of the tapered roller 4, and it is possible to reduce the dispersion of the rotation torque.

In this case, the present invention can be applied to the following embodiments.

In the embodiment mentioned above, there is shown the structure which is ground so that the surface roughness of the large diameter side end face 4A of the tapered roller 4 satisfies the expressions (1) and (2) mentioned above, and is ground so that the guide surface 8 of the collar portion 7 is along the circumferential direction, however, even by grinding the guide surface 8 of the collar portion 7 so that the surface roughness satisfies the expression (1) and (2) mentioned above, it is possible to restrict the problems such as the seizure, the abrasion or the like in the same manner. Further, it is possible to grind so that the surface roughness in both the end face and the guide surface satisfies the expressions (1) and (2) mentioned above.

Figure 11:
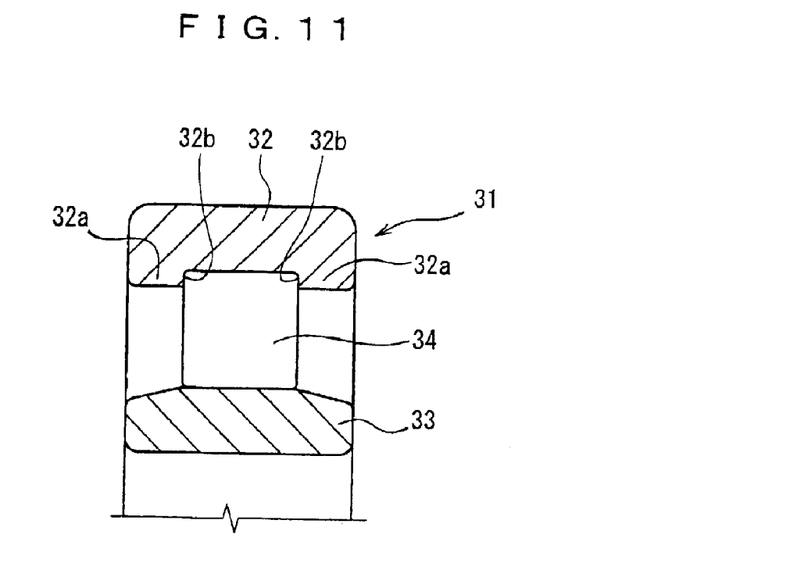
FIG. 11 is a cross sectional view of another roller bearing to which the present invention is applied.
Figure 12:
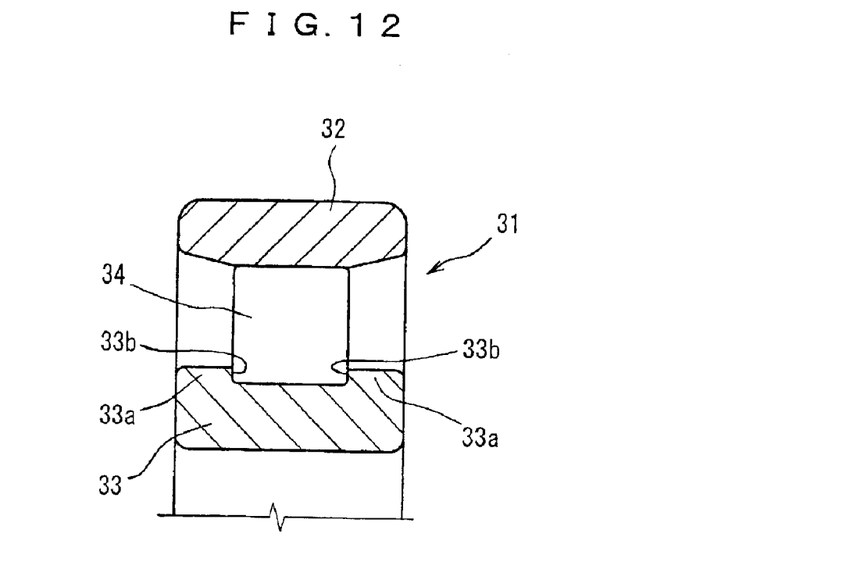
FIG. 12 is a cross sectional view of further the other roller bearing to which the present invention is applied.

The roller bearing in accordance with the present invention can be applied to the other roller bearings respectively shown in FIGS. 11 and 12, for example, a roller bearing 31 provided with a cylindrical roller.

The roller bearing 31 shown in FIGS. 11 and 12 is provided with an outer ring 32, an inner ring 33 and a cylindrical roller 34. The roller bearing 31 shown in FIG. 11 is provided with collar portions 32a extending to an inner side in a diametrical direction in both ends in an axial direction of an inner diameter of the outer ring 32, and is made in a type of guiding in a slide contact manner both end faces of the cylindrical roller 34 by inner side faces 32b of the collar portions 32a. The roller bearing 31 shown in FIG. 12 is provided with collar portions 33a extending to an outer side in a diametrical direction in both ends in an axial direction of an outer diameter of the inner ring 33, and is made in a type of guiding in a slide contact manner both end faces of the cylindrical roller 34 by inner side faces 33b of the collar portions 33a. In this case, there is a roller bearing of a type that the collar portions 32a and 33a are provided in one side in the axial direction and collar rings are attached to another side in the axial direction, which is not illustrated, and the present invention can be applied to this type of roller bearing.

In these types of roller bearings 31, the surface roughness of at least one of the inner side faces 32b and 33b of the collar portions 32a and 33a, and the end face 34a of the cylindrical roller 34 is defined to the value satisfying both the conditional expressions (1) and (2).

Figure 13:
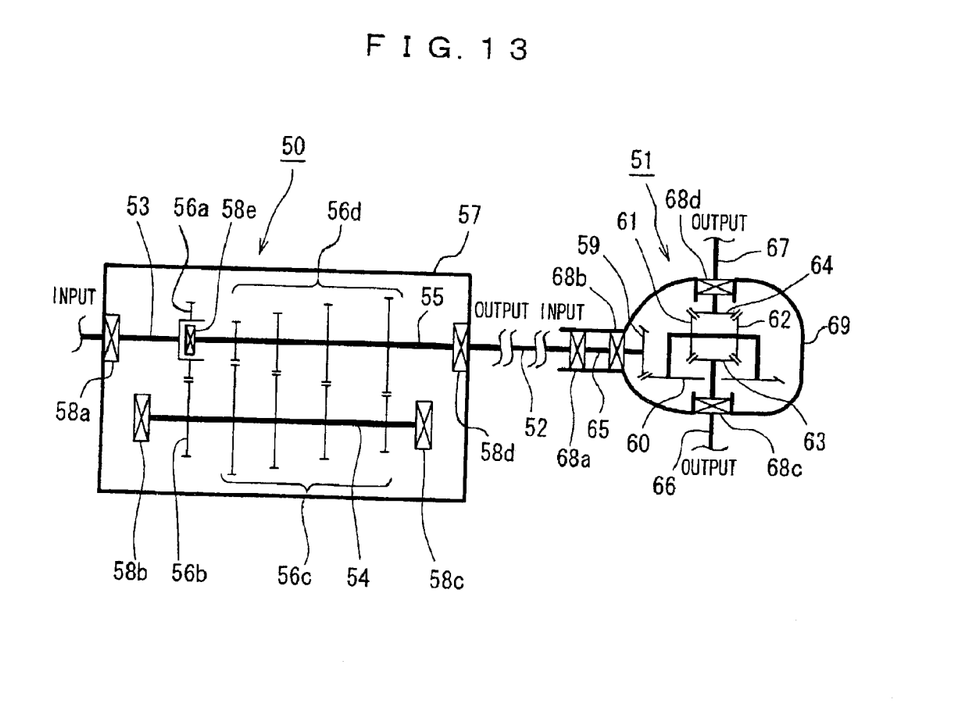
FIG. 13 is a view of a structure in which the roller bearing in accordance with the present invention is applied to a transmission and a differential gear for an FR motor vehicle.
Figure 14:
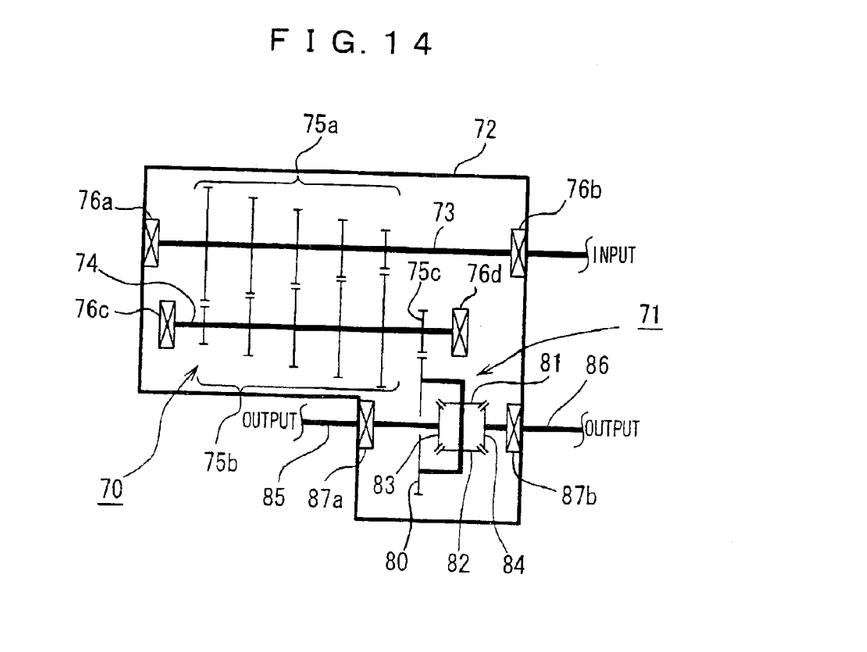
FIG. 14 is a view of a structure in which the roller bearing in accordance with the present invention is applied to a transmission and a differential gear for an FF motor vehicle.

The tapered roller bearing 1 mentioned above is employed in an inner portion of the vehicle-use transmission or the vehicle-use differential gear such as the motor vehicle or the like. FIG. 13 shows a front-engine rear-drive (FR) type power transmission system, and FIG. 14 shows a front-engine front-drive (FF) type power transmission system.

In FIG. 13, a transmission 50 and a differential gear 51 are connected via a propeller shaft 52. The transmission 50 is provided with an input shaft 53, a counter shaft 54 and an output shaft 55. The input shaft 53 is provided with a gear 56a, the counter shaft 54 is provided with a gear 56b and a plurality of transmitting gears 56c, and the output shaft 55 is provided with a plurality of transmitting gears 56d.

The input shaft 53 is rotatably supported to a casing 57 via one rolling bearing 58a, the counter shaft 54 is rotatably supported to the casing 57 via two rolling bearings 58b and 58c, and the output shaft 55 is rotatably supported to the casing 57 via two rolling bearings 58d and 58e, respectively.

The input shaft 53 is rotated by a rotation output of an engine, this rotation is transmitted to the gear 56b provided in the counter shaft 54 from the gear 56a, and the counter shaft 54 is rotated. Any of a plurality of the transmitting gears 56c provided in the counter shaft 54 is engaged with any of a plurality of transmitting gears 56d provided in the output shaft 55, and the rotation of the counter shaft 54 is gear changed so as to be transmitted to the output shaft 55.

A lot of rolling bearings 58a to 58e employed in the inner portion of the transmission 50 are set to the tapered roller bearing 1 described in the embodiment mentioned above. In this case, the rolling bearing 58a supporting the input shaft 53 and the rolling bearing 58d supporting the output shaft 55 are face-to-face mounted, two rolling bearings 58d and 58e supporting both ends of the output shaft 55 are face-to-face arranged, and the rolling bearings 58b and 58c supporting both ends of the counter shaft 54 are face-to-face arranged.

The differential gear 51 is provided with a drive pinion gear 59, a ring gear 60, a pair of differential pinion gears 61 and 62, and two left and right side pinion gears 63 and 64. The drive pinion shaft 65 integrally provided in the drive pinion gear 59 is rotatably supported to a casing 69 via two rolling bearings 68a and 68b. A left drive shaft 66 integrally provided in the side pinion gear 63 in a lower side in FIG. 13, and a right drive shaft 67 integrally provided in the side pinion gear 64 in an upper side in FIG. 13 are rotatably supported to the casing 69 via respective one rolling bearings 68c and 68d.

A lot of rolling bearings 68a to 68d employed in the inner portion of the differential gear 51 are set to the tapered roller bearing 1 described in the embodiment mentioned above. In this case, two rolling bearing 68a and 68b supporting the drive pinion shaft 65 are back-to-back arranged, and one rolling bearing 68c supporting the left drive shaft 66 and one rolling bearing 68d supporting the right drive shaft 67 are face-to-face arranged.

As mentioned above, by employing the tapered roller bearing in which the dispersion of the rotation torque is small and the seizure resistance is high as mentioned above, in the inner portion of the transmission 50 and the differential gear 51, it is possible to improve a rotation performance and a durability of the transmission 50 and the differential gear 51.

In FIG. 14, reference numeral 70 denotes a transmission, and reference numeral 71 denotes a differential gear. The transmission 70 and the differential gear 71 are provided in an inner portion of a single casing 72.

The transmission 70 is provided with an input shaft 73 and a counter shaft 74.

The input shaft 73 is provided with a plurality of transmitting gears 75a, and the counter shaft 74 is provided with a plurality of transmitting gears 75b and an output gear 75c.

Both ends of the input shaft 73 are rotatably supported to the casing 72 via a pair of rolling bearings 76a and 76b, and both ends of the counter shaft 74 are rotatably supported to the casing 72 via a pair of rolling bearings 76b and 76c.

The input shaft 73 is rotated by the rotation output of the engine, any of a plurality of the transmitting gears 75a provided in the input shaft 73 is engaged with any of a plurality of transmitting gears 75b provided in the counter shaft 74, and the rotation of the counter shaft 74 is gear changed. The rotation of the counter shaft 74 is transmitted to the differential gear 71 via the output gear 75c.

A lot of rolling bearings 76a to 76d employed in the inner portion of the transmission 70 are set to the tapered roller bearing 1 described in the embodiment mentioned above. In this case, a pair of rolling bearings 76a and 76b supporting the input shaft 73 and a pair of rolling bearings 76c and 76d supporting the counter shaft 74 are face-to-face arranged.

The differential gear 71 is provided with a ring gear (or called as a final gear) 80, a pair of differential pinion gears 81 and 82, and a pair of side pinion gears 83 and 84.

A left drive shaft 85 integrally provided in the side pinion gear 83 in the left side, and a right drive shaft 86 integrally provided in the side pinion gear 84 in the right side are rotatably supported to the casing 72 via respective one rolling bearings 87a and 87b.

Two rolling bearings 87a and 87b employed in the inner portion of the differential gear 71 are set to the tapered roller bearing 1 described in the embodiment mentioned above. In this case, two rolling bearing 87a and 87b are face-to-face arranged.

As mentioned above, by employing the tapered roller bearing in which the dispersion of the rotation torque is small and the seizure resistance is high as mentioned above, in the inner portion of the transmission 70 and the differential gear 71, it is possible to improve a rotation performance and a durability of the transmission 70 and the differential gear 71.

In this case, in the embodiments in FIGS. 13 and 14, all the rolling bearings are set to the tapered roller bearings 1 described in the embodiment mentioned above, however, it is possible to use the tapered roller bearing 1 described in the embodiment mentioned above in a required position in correspondence to concrete loads, shapes and the like of the transmission and the differential gear, and it is possible to use the rolling bearing of another type in the other positions.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A roller bearing comprising:

an outer ring;

an inner ring coaxially arranged with the outer ring; and a plurality of rollers interposed between the outer ring and the inner ring;

wherein a collar portion having a guide surface guiding one end face of the roller in accordance with a slip contact is provided in at least one axial end portion of the outer ring and the inner ring, and surface roughness in at least one of the end face of the roller and the guide surface of the collar portion is defined as a value satisfying the following conditional expressions (1), (2) and (3):

$$0.04\ \mu m \leq Ra(r) \leq 0.1\ \mu m \quad (1)$$

$$0.8 \leq Ra(r)/Ra(c) \leq 1.1 \quad (2)$$

$$Ra(r)/Ra(c) \neq 1.0 \quad (3)$$

where, Ra (r) is an arithmetic average of roughness in a radial direction on the end face of the roller, and Ra (c)

is an arithmetic average of roughness in a peripheral direction on the end face of the roller.

2. The roller bearing as claimed in claim 1, wherein the roller is a cylindrical roller.

3. The roller bearing as claimed in claim 1, wherein the roller is a tapered roller.

4. A vehicle-use transmission comprising:

an input shaft on the side of an engine provided with a plurality of gears;

a pair of rolling bearings supporting the input shaft to a casing;

a counter shaft on the side of a drive tire wheel having a plurality of gears;

a pair of rolling bearings supporting said counter shaft to said casing;

rotation of the input shaft being transmitted to said counter shaft via any of the gears; and wherein at least one of the rolling bearings is the roller baring as claimed in claim 3.

5. A vehicle-use transmission comprising:

an input shaft in a side of an engine provided with a gear;

a counter shaft provided with a plurality of gears;

an output shaft provided with a plurality of gears; and a plurality of rolling bearings rotatable supporting these shafts to a casing, respectively;

rotation of the input shaft being transmitted to the output shaft via any of the gears; and wherein at least one of the rolling bearings is the roller bearing as claimed in claim 3.

6. A vehicle-use differential gear comprising:

a drive pinion shaft having a drive pinion;

a pair of rolling bearings rotatably supporting the drive pinion to a casing;

a ring gear engaged with the drive pinion;

a pair of side gears to which rotation of the drive pinion is transmitted from the ring gear;

a pair of rolling bearings rotatably supporting each of the pair of side gears to the casing; and wherein at least one of the rolling bearings is the roller bearing as claimed in claim 3.

7. A vehicle-use differential gear comprising:

a ring gear engaged with an output gear of a transmission;

a pair of side gears to which rotation of the output gear is transmitted from the ring gear;

a pair of rolling bearings supporting each of the pair of the gears to a casing;

the rotation of the output gear being transmitted to the side gear via the ring gear; and wherein at least one of the rolling bearings is the roller bearing as claimed in claim 3.

* * * * *